United States Patent
Boyer

(10) Patent No.: US 9,225,156 B2
(45) Date of Patent: Dec. 29, 2015

(54) CONDUIT SPACER ASSEMBLY

(75) Inventor: Mark L. Boyer, Houston, TX (US)

(73) Assignee: BOYER INC., Houston, TX (US)

( * ) Notice: Subject to any disclaimer, the term of this patent is extended or adjusted under 35 U.S.C. 154(b) by 200 days.

(21) Appl. No.: 13/542,362

(22) Filed: Jul. 5, 2012

(65) Prior Publication Data

US 2014/0007402 A1 Jan. 9, 2014

(51) Int. Cl.
  *F16L 3/22* (2006.01)
  *B23P 17/04* (2006.01)
  *F16L 3/08* (2006.01)
  *F16L 3/16* (2006.01)
  *H02G 3/32* (2006.01)
  *H02G 1/08* (2006.01)
  *H02G 9/06* (2006.01)

(52) U.S. Cl.
  CPC . *H02G 3/32* (2013.01); *H02G 1/08* (2013.01); *H02G 9/06* (2013.01); *Y10T 29/49826* (2015.01)

(58) Field of Classification Search
  USPC .............. 248/68.1, 55, 73; 29/428; 405/184.4
  See application file for complete search history.

(56) References Cited

U.S. PATENT DOCUMENTS

| | | | | | |
|---|---|---|---|---|---|
| 1,474,059 | A | * | 11/1923 | Voellmecke | 248/72 |
| 1,873,357 | A | * | 8/1932 | St John Everett | 248/61 |
| 4,028,903 | A | * | 6/1977 | Dietrich | 405/170 |
| 4,218,158 | A | * | 8/1980 | Tesson | 405/170 |
| 4,550,690 | A | * | 11/1985 | Baugher | 122/510 |
| 4,941,773 | A | * | 7/1990 | Vergouw | 405/157 |
| 4,993,669 | A | * | 2/1991 | Dyer | 248/61 |
| 5,181,680 | A | * | 1/1993 | Coll | 248/61 |
| 5,518,339 | A | * | 5/1996 | Shimizu | 405/174 |
| 5,730,399 | A | * | 3/1998 | Baginski | 248/58 |
| 6,505,796 | B1 | * | 1/2003 | Roth | 248/62 |
| 6,711,328 | B2 | * | 3/2004 | Griffioen et al. | 385/100 |
| 7,806,629 | B2 | * | 10/2010 | McCoy | 405/184.4 |
| 7,942,371 | B1 | | 5/2011 | McCoy | |
| 8,579,239 | B2 | * | 11/2013 | Lothamer | 248/69 |
| 2008/0279635 | A1 | * | 11/2008 | McCoy | 405/155 |
| 2012/0318934 | A1 | * | 12/2012 | Thomas | 248/58 |
| 2012/0325983 | A1 | * | 12/2012 | Vrame | 248/68.1 |

OTHER PUBLICATIONS

Conduit-In-Casing Construction, Feb. 24, 2002, 8 Pages, Polymer Raceway Products Section of the National Electrical Manufacturers Associate (NEMA).

* cited by examiner

*Primary Examiner* — Tara M. Pinnock
(74) *Attorney, Agent, or Firm* — Patterson & Sheridan, LLP

(57) ABSTRACT

A conduit spacer assembly for supporting and conveying an inner conduit into an outer conduit. The conduit spacer assembly has one or more conveyance assemblies moveable along a track coupled to the outer conduit. One or more conduit spacers are suspended from the conveyance assemblies, and support the inner conduit. The conveyance assemblies may be coupled together by a strap member. A force applied to one conveyance assembly is transferred to the other conveyance assemblies via the strap member. An installation assembly having a frame structure and a track support assist with the installation of the conduit spacer assembly and the inner conduit.

16 Claims, 10 Drawing Sheets

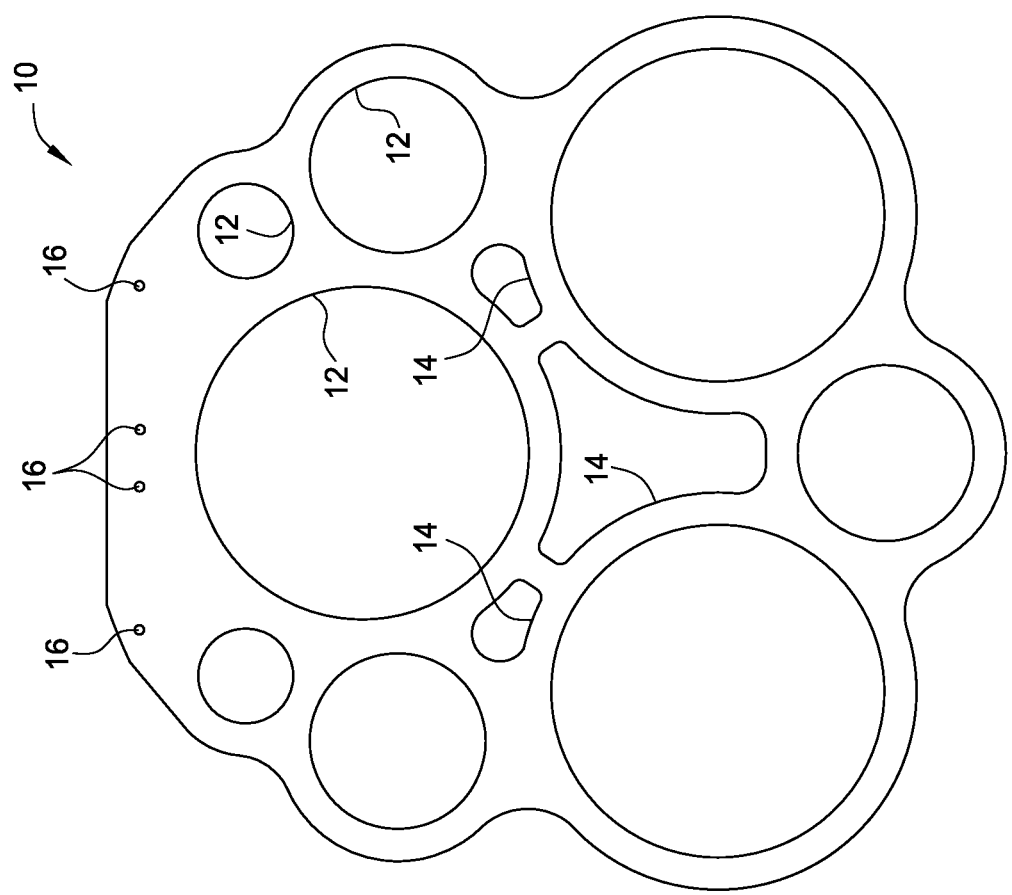

CONDUIT SPACER ASSEMBLY

BACKGROUND OF THE INVENTION

1. Field of the Invention

Embodiments of the invention relate to a conduit spacer assembly.

2. Description of the Related Art

Many different types of cable lines are run underground for a variety of reasons. One reason may be to protect them from surface weather elements or from interference or damage that may be caused when installed above ground or on poles or other structures. Other reasons may be the inability to run the cable lines across one or more structures, such as a highway, a body of water, or a railroad.

In particular, cable lines are run through multiple underground protective conduits, also called ducts. The conduits are positioned parallel to each other and are spaced apart from each other in a controlled manner. The spacing may act to minimize electrical interference, and to dissipate heat generated by transmission of electric power and electric signals through the cables.

The conduits and cables should also be protected from digging, whether with hand tools or with mechanized equipment, such as backhoes. Thus, in some cases, the multiple conduits are secured to each other and then collectively installed in a single, larger outermost conduit known as a casing. The casing is usually formed from steel. To secure the conduits together and space them apart within the casing, one or more bore spacers may be used.

Generally, a bore spacer is circular disc having several holes for receiving and supporting the conduits. These bore spacers, however, are difficult to maneuver when manually installing the conduits in the casing. Each conduit is manually inserted through a hole in one or more bore spacers, and then the conduits and spacers are collectively inserted into the casing. The spacers have a tendency to buckle or twist when being inserted into the casing, which may require remedial action and increase installation time.

When the conduits are installed in the casing, a fill material such as cement is usually injected to fill the spaces between conduits. The fill material provides additional protection, stability, and thermal insulation. The bore spacers also have a tendency to inhibit or obstruct flow of the fill material between the conduits, resulting in some areas having little or no support or insulation.

Therefore, there is a need for new and improved conduit spacing systems.

SUMMARY OF THE INVENTION

In one embodiment, a conduit spacer assembly for supporting and conveying one or more inner conduits into an outer conduit may comprise a conduit spacer; and a conveyance assembly coupled to the conduit spacer, wherein the conveyance assembly is configured to move the conduit spacer along a track that is secured to the outer conduit.

In one embodiment, a conduit spacer assembly for supporting a conduit spacer assembly movable into an outer conduit may comprise a frame structure having a cross bar and one or more legs connected to the cross bar; and a track support member coupled to the cross bar and configured to support a track, wherein the conduit spacer assembly is movable along the track to guide a conduit spacer into the outer conduit.

In one embodiment, a method of installing an inner conduit in an outer conduit may comprise coupling a track to the outer conduit; coupling a conveyance assembly to the track; inserting the inner conduit into a conduit spacer suspended from the conveyance assembly; and moving the conveyance assembly along the track to move the conduit spacer and the inner conduit into the outer conduit.

BRIEF DESCRIPTION OF THE DRAWINGS

So that the manner in which the above-recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 1 illustrates a conduit spacer according to one embodiment.

DETAILED DESCRIPTION

An underground conduit construction procedure may be performed to route one or more cable lines below a surface obstruction, such as a highway, a body of water, or a railroad. The procedure may include excavating and shoring pits on both sides of the surface obstruction. A bore is formed under the surface obstruction to connect the excavated pits. An outer conduit, such as a steel casing, may be installed in the bore. In one embodiment, the steel casing may be pushed into place with hydraulic jacks while the earth ahead of the casing is removed with a boring device or by hand. One or more inner conduits may be placed in the outer conduit, and may be supported by one or more conduit spacers. In one embodiment, the inner conduits may be formed from a plastic material, such as polyvinyl chloride (PVC) or polyethylene (PE), or a fiberglass material. Grout, cement, sand, or other similar type of supporting/insulating material may be injected into the area between the inner conduits and the outer conduit and allowed to cure. One or more cable lines may then be pulled or pushed through the inner conduits.

FIG. 1 illustrates a conduit spacer 10 for supporting one or more conduits. The conduit spacer 10 may include one or more circular openings 12 of various diameters through which conduits may be disposed. The number, size, and shape of the openings 12 may be formed to the specific conduits desired for support. The arrangement of the openings 12 may also be formed to the desired conduit spacing. The conduit spacer 10 may also include one or more flow passages 14 of various sizes and shapes for allowing unobstructed fluid flow through the spacer during installation. In one embodiment, the conduit spacer 10 may be formed from a metallic material. The conduit spacer 10 may further include one or more bolt holes 16 for securing the conduit spacer 10 to the assembly as described herein.

Figure 2A:
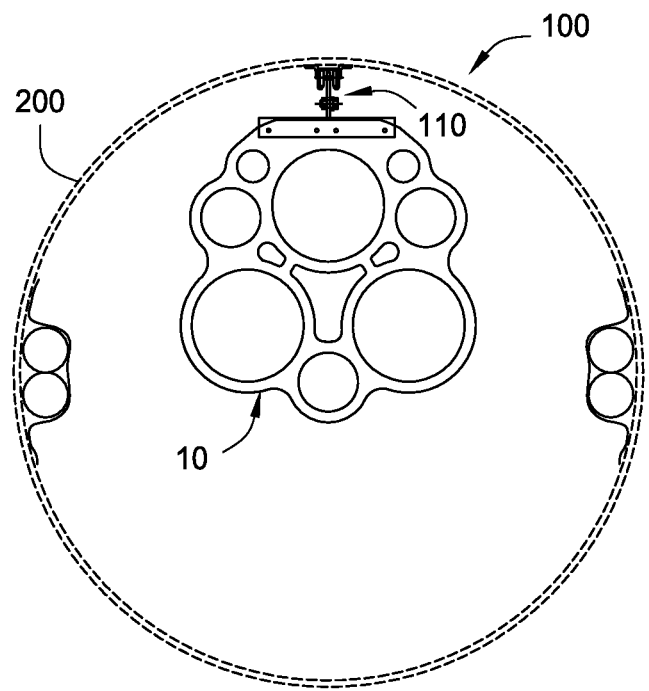
FIGS. 2A-2C illustrate a conduit spacer assembly according to one embodiment.
Figure 2B:
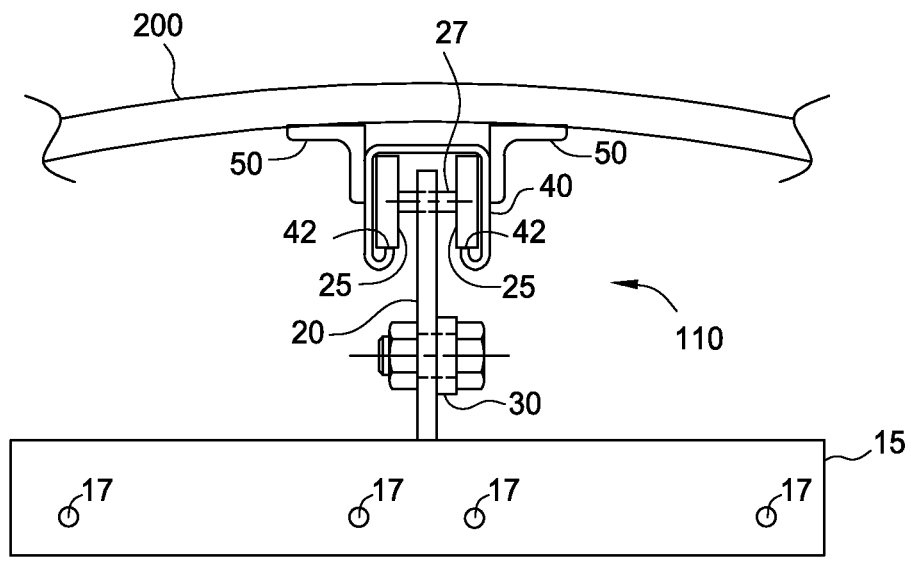
Figure 2C:
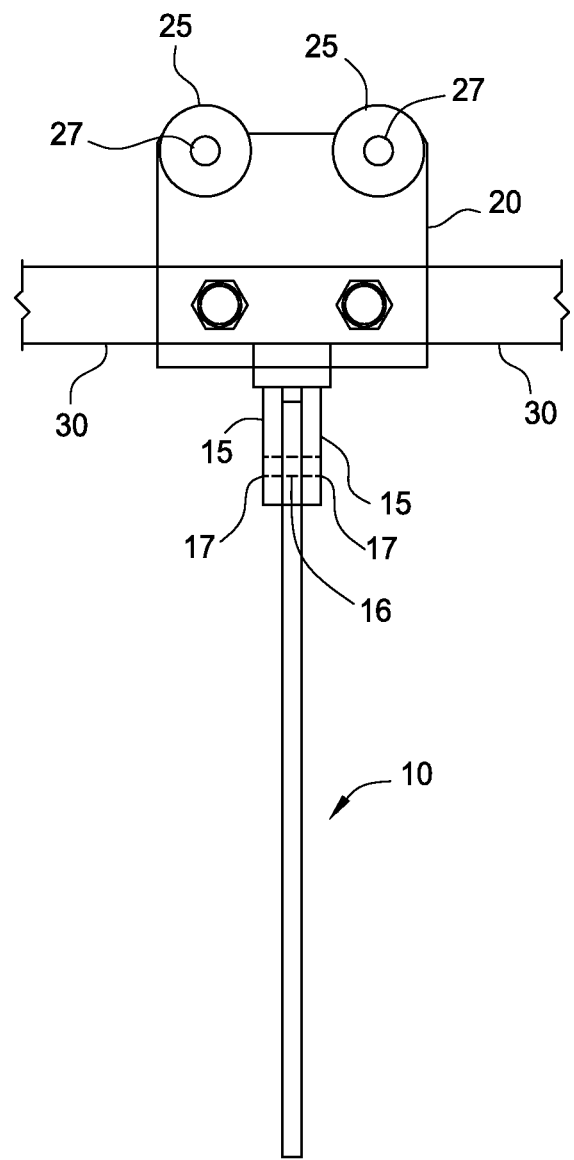

FIGS. 2A-2C illustrate a conduit spacer assembly 100 disposed in an outer conduit 200. The conduit spacer assembly 100 may include the conduit spacer 10 and a conveyance assembly 110 for supporting and conveying one or more conduit spacers 10 through the outer conduit 200. An upper edge or end of the conduit spacer 10 may be secured to the conveyance assembly 110 such that the conduit spacer 10 is suspended from the conveyance assembly 110.

Figure 3A:
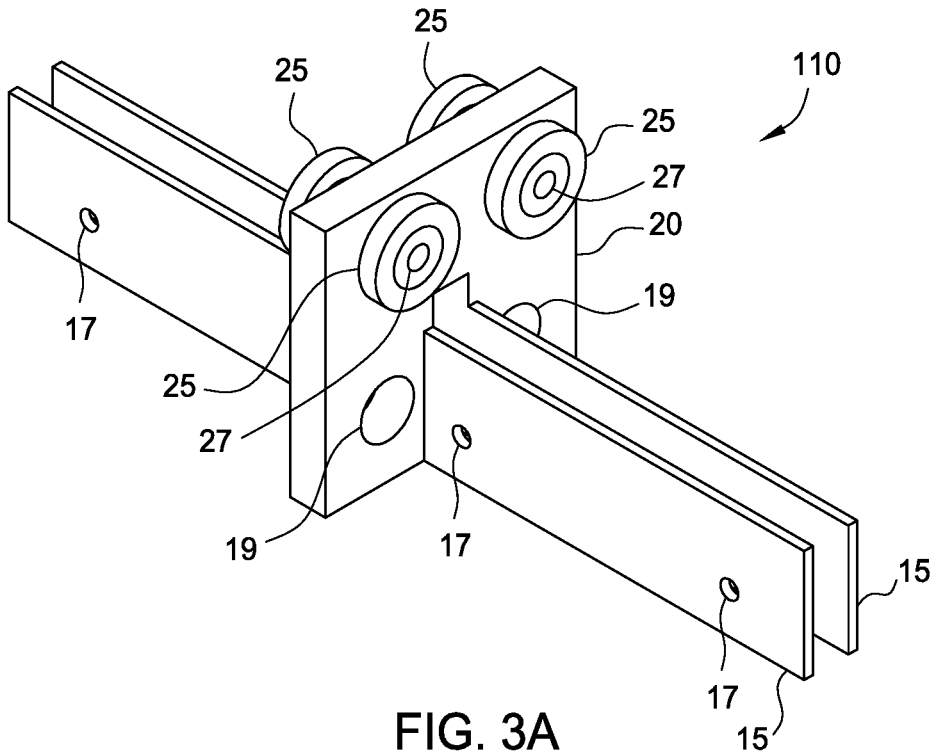
FIGS. 3A-3C illustrate a conveyance assembly for the conduit spacer according to one embodiment.
Figure 3B:
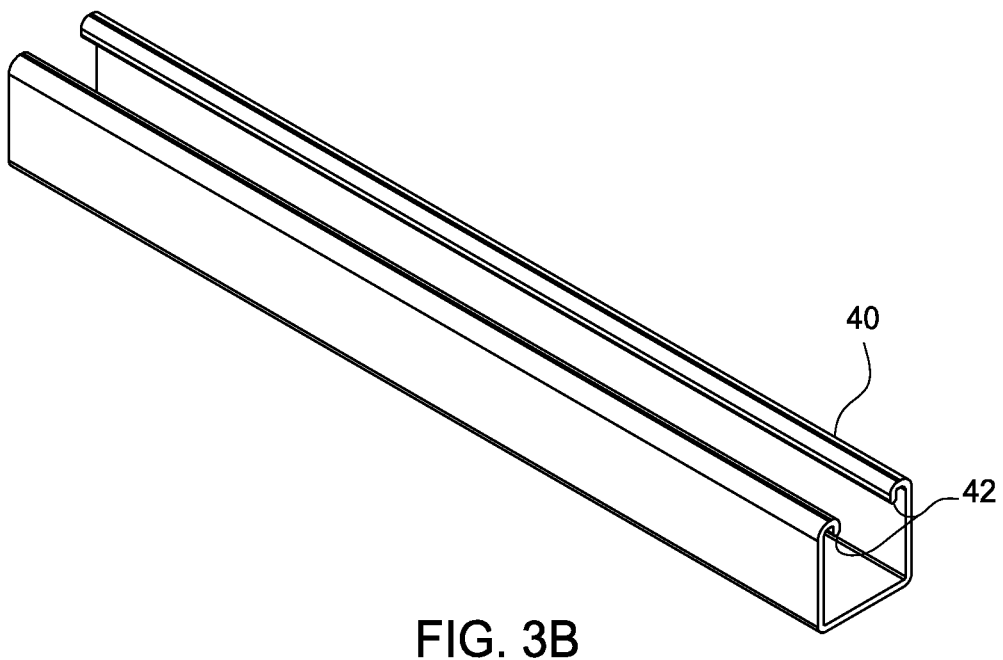
Figure 3C:
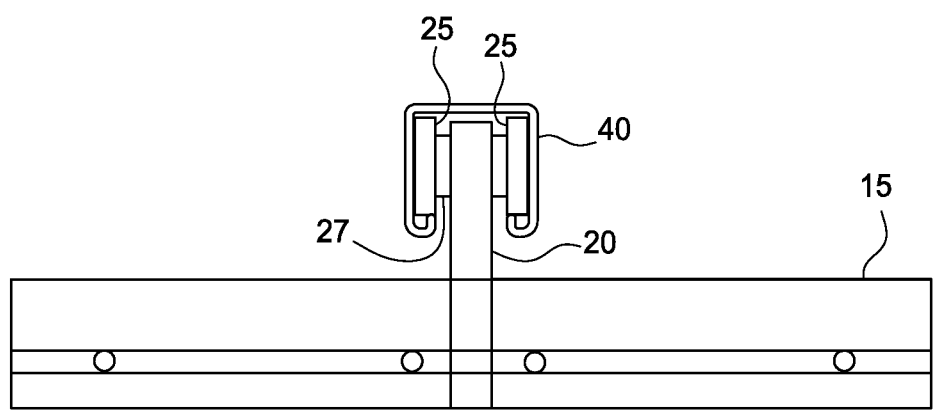

The conveyance assembly 110 is further illustrated in FIGS. 3A-3C. As illustrated, the conveyance assembly 110 includes a pair of support members 15 for connecting the conduit spacer 10 to the conveyance assembly 110. The support members 15 may include a pair of metallic plates, and the conduit spacer 10 may be disposed between the support members 15 and secured thereto by a bolted connection via one or more bolts holes 17 corresponding to bolt holes 16 of the conduit spacer 10. The conduit spacer 10 may be secured to the support members 15 by other releasable-type connections, or by a permanent connection, such as a welded connection.

The support members 15 may be secured to a primary support member 20, such as a metallic plate, using a releasable-type connection or a permanent connection, such as a welded connection. In one embodiment, the support members 15 and the primary support member 20 may be formed integral with each other as a solid unitary piece. The primary support member 20 supports one or more rollers 25, such as wheels, having axles 27 disposed through the primary support member 20. Although illustrated with four rollers 25, the conveyance assembly 110 may include only one or two rollers 25 and a single axle 27 disposed through the center of the primary support member 20, or may include more than four rollers 25 and corresponding axles 27. The rollers 25 are configured to move through a track 40, which is secured to the inner surface of the outer conduit 200 via one or more elbows 50.

The track 40 may be a longitudinal member having a substantially U-shaped cross-section, and one or more rails 42 along which the rollers 25 move to convey the conduit spacer 10 through the outer conduit 200. In one embodiment, the track 40 may be a solid unitary member that extends across a portion of or the entire longitudinal length of the outer conduit 200. In one embodiment, the track 40 may be one or more members coupled together to extend across a portion of or the entire longitudinal length of the outer conduit 200.

The elbows 50 may be longitudinal members having a substantially L-shaped cross-section, and having a first side secured to the track 40 and a second side secured to the outer conduit. The first and second sides of the elbow 50 may be perpendicular to each other. In one embodiment, each elbow 50 may be a solid unitary member that extends across a portion of or the entire longitudinal length of the outer conduit 200 and/or the track 40. In one embodiment, each elbow 50 may be one or more members coupled together to extend across a portion of or the entire longitudinal length of the outer conduit 200 and/or the track 40.

One or more straps 30 may be secured to the primary support member 20 by a bolted connection via one or more bolt holes 19. The strap 30 may be secured to the primary support member 20 by other releasable-type connections, or by a permanent connection, such as a welded connection. In one embodiment, the strap 30 may be a solid, metallic plate member, or a flexible member. In one embodiment, the strap 30 may be a unitary member that extends across a portion of or the entire longitudinal length of the outer conduit 200 and/or the track 40. In one embodiment, the strap 30 may be one or more members coupled together to extend across a portion of or the entire longitudinal length of the outer conduit 200 and/or the track 40. The strap 30 may be connected to one or more conduit spacer assemblies 100 such that an axial force (e.g. a push or pull force) applied to the strap 30 and/or one conduit spacer assembly 100 may be transmitted to one or more other conduit spacer assemblies 100 via the strap 30. In this manner, the one or more conduit spacers 10 may be conveyed efficiently, easily, and in unison through the outer conduit 200.

Figure 4A:
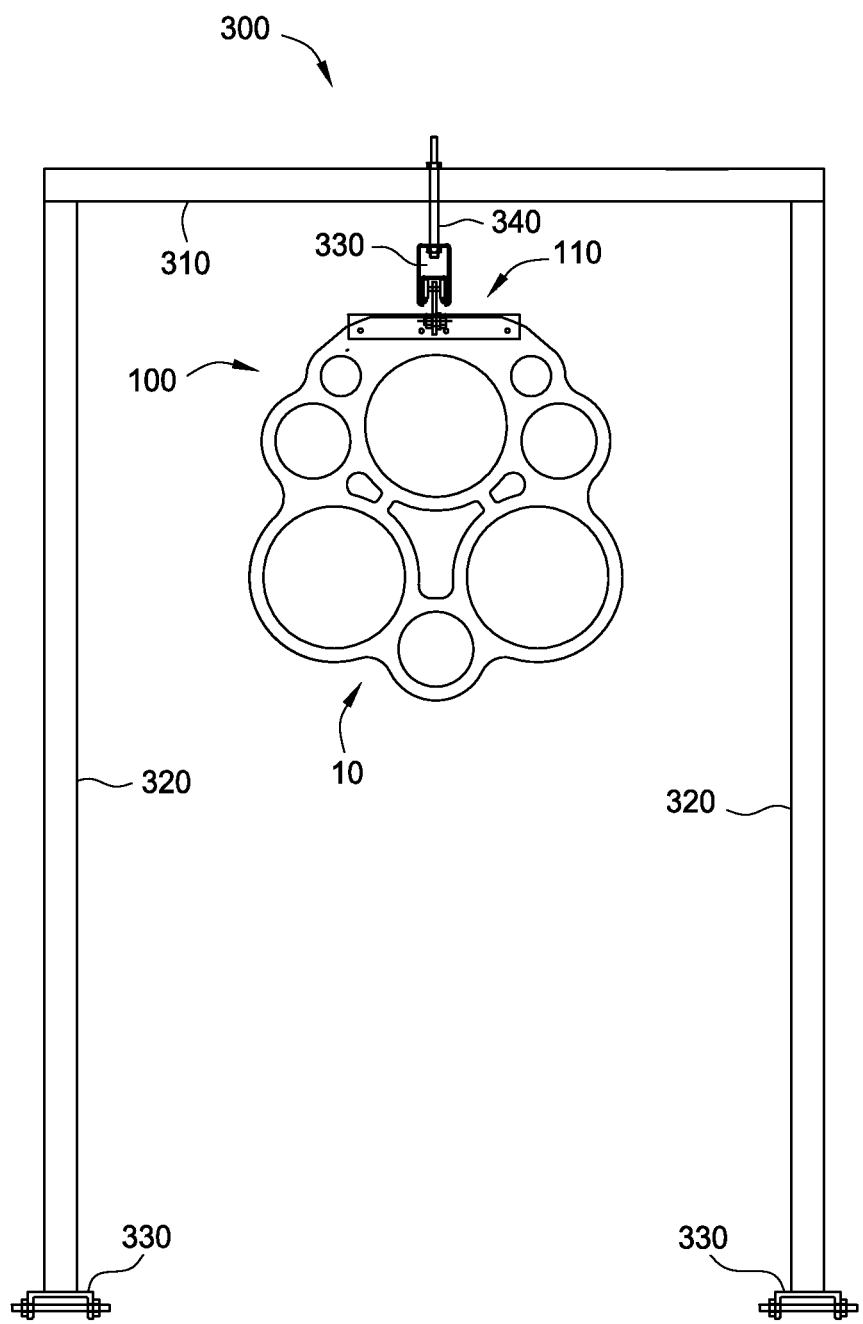
FIGS. 4A and 4B illustrate a first installation assembly according to one embodiment.
Figure 4B:
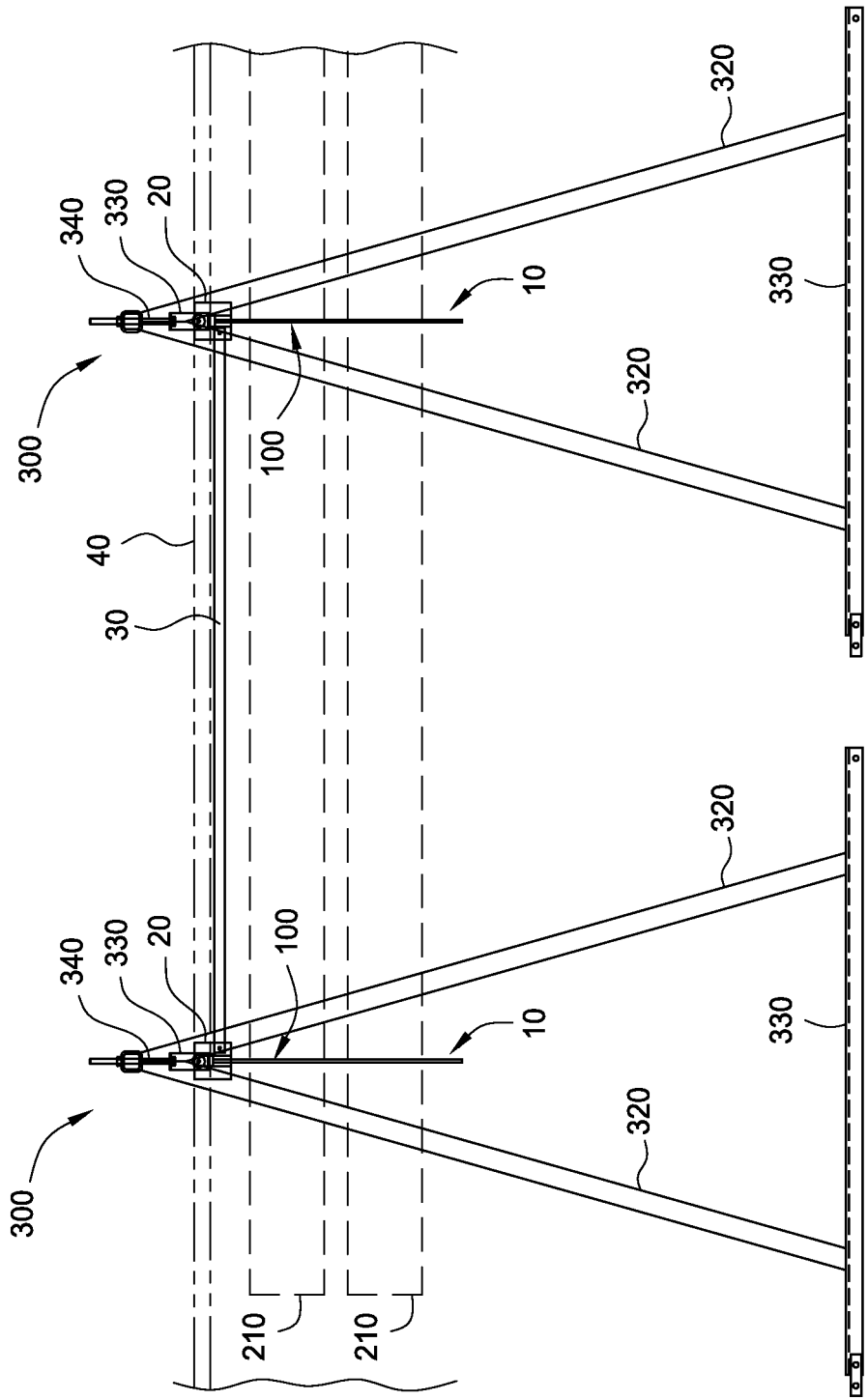

FIGS. 4A and 4B illustrate an installation assembly 300 configured to support one or more conduit spacer assemblies 100 prior to or during installation in an outer conduit 200. The installation assembly 300 generally forms a frame structure including an upper cross bar 310 having a pair of legs 320 connected to each end of the cross bar 310. Each pair of legs 320 may be connected to a base 330, thereby forming a triangular support arrangement on opposite ends of the cross bar 310. The base 330 may be positioned generally at an angle perpendicular to the cross bar 310. The cross bar 310, the legs 320, and/or the base 330 may be formed as an integral structure, or may be formed from separate members secured together by a releasable (e.g. bolted) or permanent (e.g. welded) connection. In one embodiment, the cross bar 310, the legs 320, and/or the base 330 may be formed from a metallic material. A pin member 340 may be secured to and suspended from the cross bar 310 to support a track support 330. The track support 330 may be secured to and suspended from the pin member 340 to support the conduit spacer assembly 100. In one embodiment, the track support 330 may directly support the track 40 or a portion of the track 40, without inhibiting conveyance of the conduit spacer 10 along the track 40.

As illustrated in FIG. 4B, two installation assemblies 300 are spaced apart, each supporting a conduit spacer assembly 100. The conduit spacer assemblies 100 are aligned such that one or more inner conduits 210 may be disposed through the conduit spacers 10. The inner conduits 210 may comprise a single unitary member, or may comprise multiple members or sections coupled together at the ends. The track 40 may extend into and be secured to the outer conduit 200 as illustrated in FIGS. 2A and 2B. In this manner, the inner conduits 210 may be easily installed onto one or more conduit spacer assemblies 100 and conveyed into the outer conduit 200.

As further illustrated, the strap member 30 is coupled to the primary support members 20 of each conveyance assembly 110. Thus, any force applied to the inner conduits 210 and/or one of the conduit spacer assemblies 100 is transferred to the other conveyance assemblies 110 to move the inner conduits 210 into and/or through the outer conduit 200 along the track 40. This installation procedure may be repeated using the same installation assemblies 300. Additional conduit spacer assemblies 100 may be subsequently secured to the track 40 for supporting subsequent inner conduit portions for connection to the existing inner conduits 210 already disposed in the outer conduit 200.

Figure 5A:
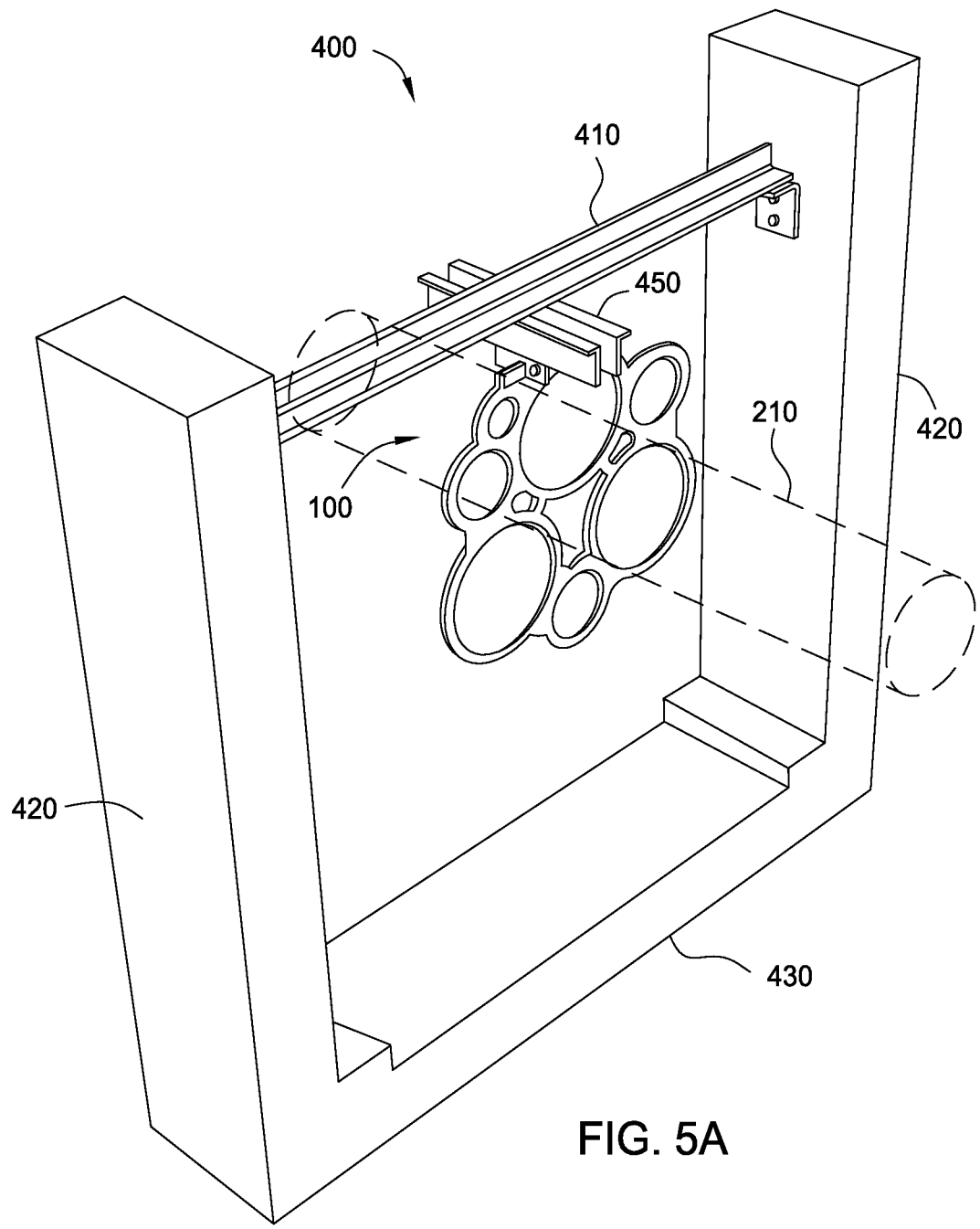
FIGS. 5A-5C illustrate a second installation assembly according to one embodiment.
Figure 5C:
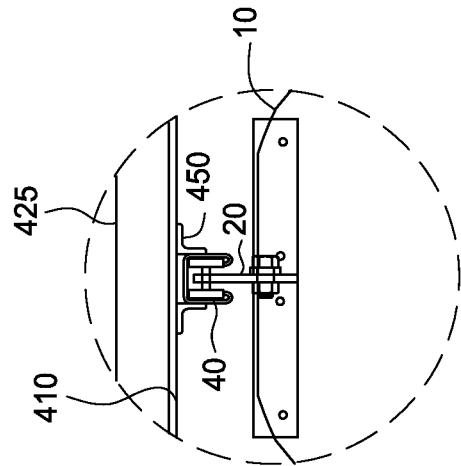
Figure 5B:
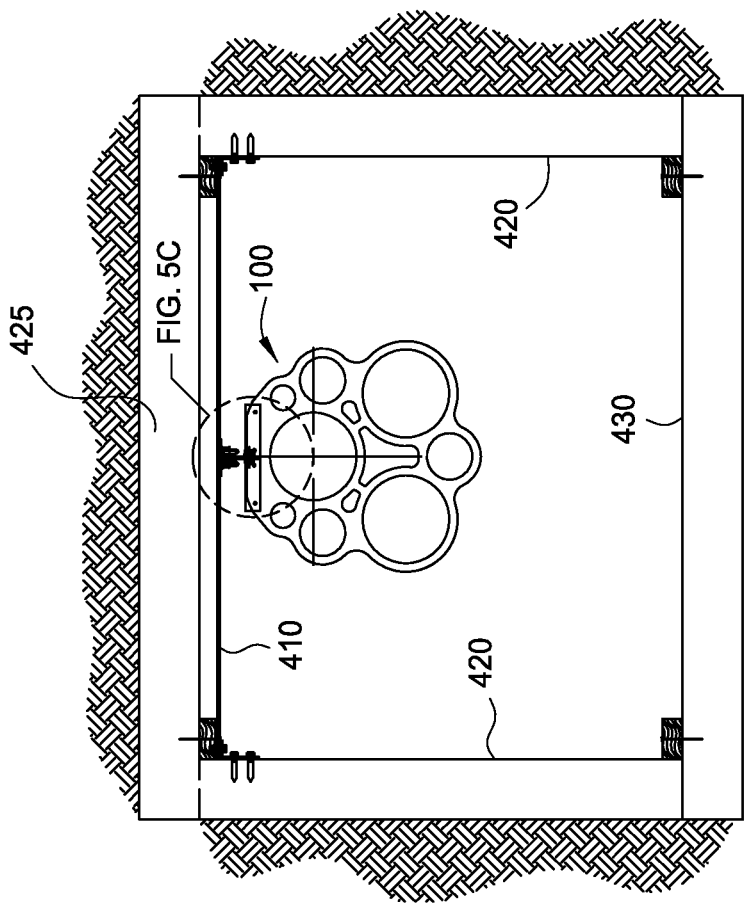

FIGS. 5A-5C illustrate an installation assembly 400 configured to support one or more conduit spacer assemblies 100 prior to or during installation in an outer conduit 200. The installation assembly 400 generally forms a frame structure including an upper cross bar 410 connected to a pair of legs 420. Each leg 420 may be connected to an upper base 425 (illustrated in FIG. 5B) and/or a lower base 430, thereby forming a square or rectangular support arrangement. The bases 425, 430 may be positioned generally at an angle parallel to the cross bar 410. The cross bar 410, the legs 420, and/or the bases 425, 430 may be formed as an integral structure, or may be formed from separate members secured together by a releasable (e.g. bolted) or permanent (e.g. welded or glued) connection. In one embodiment, the legs 420 and the bases 425, 430 may be formed from a metallic material or a wooden material. One or more track supports 450, such as elbows 50 described above, may be secured to and suspended from the cross bar 410 to support the track 40 and thus the conduit spacer assembly 100. In one embodiment, the track supports 450 may directly support the track 40 or a portion of the track 40, without inhibiting conveyance of the conduit spacer 10 along the track 40.

In one embodiment, one or more installation assemblies 400 may be spaced apart, each supporting a conduit spacer assembly 100, such as the installation assemblies 300 illustrated in FIG. 4B. The conduit spacer assemblies 100 may be aligned such that one or more inner conduits 210 may be disposed through the conduit spacers 10. The inner conduits 210 may comprise a single unitary member, or may comprise multiple members coupled together at the ends. The track 40 may extend into and be secured to the outer conduit 200 as illustrated in FIGS. 2A and 2B. In this manner, the inner conduits 210 may be easily installed onto one or more conduit spacer assemblies 100 and conveyed into the outer conduit 200. In one embodiment, a strap member 30 as described above may be used with the embodiments of the installation assembly 400. The installation procedure may be repeated using the same installation assemblies 400.

Figure 6:
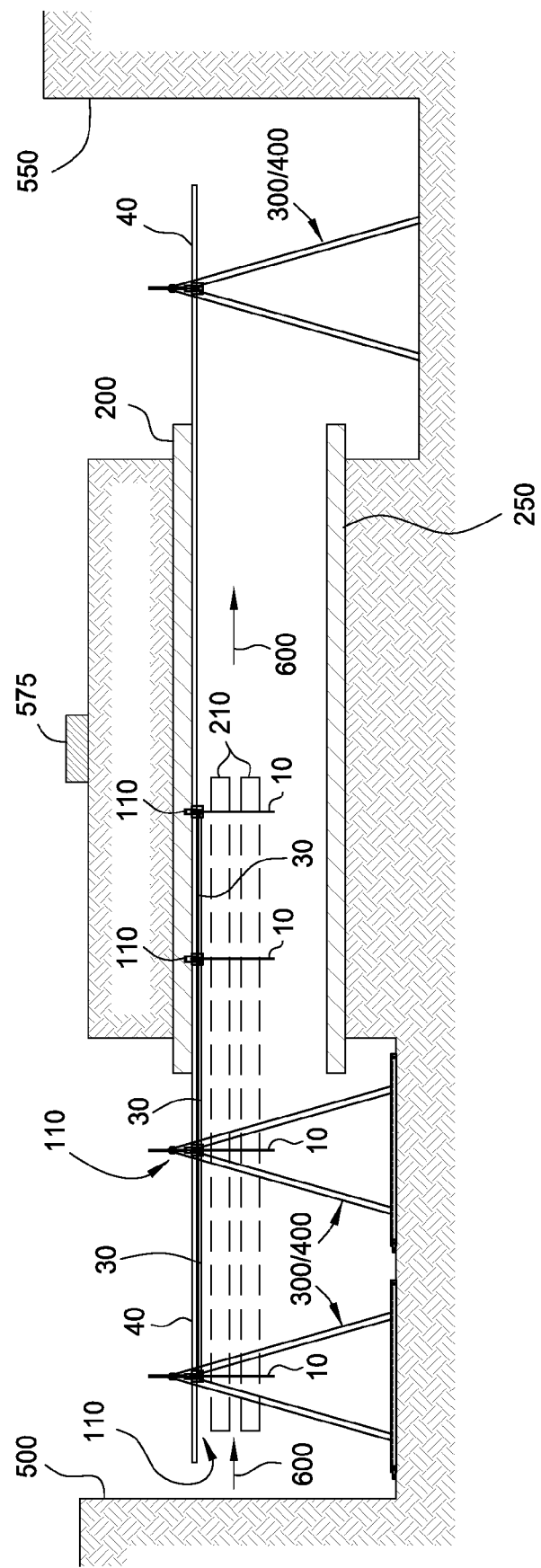
FIG. 6 illustrates an underground conduit construction process according to one embodiment.

FIG. 6 illustrates an underground conduit construction site utilizing the embodiments described herein. Two working areas 500, 550, such as excavated earthen pits, may be formed on different sides of a surface obstruction 575. A bore 250 is formed under the surface obstruction 575 to connect the working areas 500, 550. An outer conduit 200, such as a steel casing, is installed in the bore, and may be pushed into place with hydraulic jacks while the earth ahead of the outer conduit 200 is removed with a boring device or by hand. One or more installation assemblies 300, 400 may be positioned in the working areas 500, 550. The track 40 may be secured to the outer conduit 200 and the installation assemblies 300, 400 at anytime during the installation process. The conduit spacer assemblies 100 may also be secured to the installation assemblies 300, 400 as described above.

One or more inner conduits 210 may be inserted or disposed through one or more conduit spacers 10, which are movably suspended from the track 40. A force in the direction of reference arrows 600 may be applied to the inner conduits 210 and/or conduit spacer assemblies 100 to move the inner conduits 210 into the outer conduit 200. The inner conduits 210 are guided by the conveyance assemblies 110 along the track 40. The force may be transferred to through the strap member 30 to the adjoining conduit spacers 10. This process may be repeated as necessary to add additional sections of inner conduit portions and/or conduit spacer assemblies 100 to extend across the surface obstruction 575. When the inner conduits 210 are in the desired position, grout, cement, sand, or other similar type of supporting/insulating material may be injected into the area between the inner conduits 210 and the outer conduit 200 and allowed to cure. The flow passages 14 formed in the conduit spacers 10, as illustrated in FIG. 1, facilitate the ease of flow of the injected material into the areas between the inner conduits 210 and the outer conduit 200. One or more cable lines may then be pulled or pushed through the inner conduits 210.

While the foregoing is directed to embodiments of the invention, other and further embodiments of the invention may be devised without departing from the basic scope thereof, and the scope thereof is determined by the claims that follow.

The invention claimed is:

1. A conduit spacer assembly for supporting and conveying one or more inner conduits, comprising:
an outer conduit;
a track coupled to the outer conduit;
a conduit spacer comprising a substantially flat body having a plurality of openings disposed through the body to support the inner conduits; and
a conveyance assembly includes one or more rollers movable along the track, wherein the conduit spacer is suspended from the conveyance assembly such that the conveyance assembly moves the conduit spacer along the track through the outer conduit, wherein the rollers are rotationally coupled to a support member having a pair of plates coupled to the conduit spacer such that the conduit spacer is disposed between the plates, wherein the support member includes a primary support member coupled to the plates, and wherein the primary support member is coupled to the rollers via an axle disposed through the primary support member.

2. The assembly of claim 1, wherein the conduit spacer includes one or more flow passages disposed through the body to allow material flow through the conduit spacer.

3. The assembly of claim 1, wherein the track is secured to an inner surface of the outer conduit via one or more elbow members.

4. The assembly of claim 3, wherein a first side of the elbow member is secured to the track, and wherein a second side of the elbow member is secured to the inner surface of the outer conduit.

5. The assembly of claim 1, further including a plurality of conduit spacers and a plurality of conveyance assemblies coupled together using a strap member.

6. The assembly of claim 1, wherein the body of the conduit spacer includes holes that align with holes in the plates to couple the conduit spacer to the plates.

7. The assembly of claim 1, wherein at least one opening disposed through the body of the conduit spacer has a diameter that is different than a diameter of at least one other opening disposed through the body.

8. The assembly of claim 1, wherein the body of the conduit spacer is a metallic plate.

9. An installation assembly for supporting a conduit spacer assembly, comprising:
an outer conduit;
a track coupled to the outer conduit;
a frame structure having a cross bar and a pair of legs coupled to each end of the cross bar, wherein each pair of legs form a triangular shape; and
a track support member coupled to the cross bar and configured to support the track, wherein the conduit spacer assembly is movable along the track to guide the conduit spacer into the outer conduit.

10. The assembly of claim 9, wherein each pair of legs is coupled to a base that is positioned at an angle perpendicular to the cross bar.

11. The assembly of claim 9, wherein each leg is coupled to a base that is positioned at an angle parallel to the cross bar.

12. A method of installing an inner conduit in an outer conduit, comprising:
coupling a track to the outer conduit;
coupling a conveyance assembly to the track;
inserting the inner conduit into a conduit spacer suspended from the conveyance assembly, wherein the conduit spacer comprises a substantially flat body having one or more openings disposed through the body to support the inner conduit; and
moving the conveyance assembly along the track to move the conduit spacer and the inner conduit into the outer conduit, wherein the conveyance assembly includes one or more rollers movable along the track and coupled to a support member having a pair of plates coupled to the conduit spacer such that the conduit spacer is disposed between the plates, wherein the support member includes a primary support member coupled to the plates, and wherein the primary support member is coupled to the rollers via an axle disposed through the primary support member.

13. The method of claim 12, further comprising:

coupling a second conveyance assembly to the track;

inserting the inner conduit into a second conduit spacer suspended from the second conveyance assembly; and coupling the conveyance assemblies together using a strap member; and moving the conveyance assemblies along the track to move the conduit spacers and the inner conduit into the outer conduit.

14. The method of claim 13, further comprising applying a force to one of the conveyance assemblies via the strap member to move that conveyance assembly along the track.

15. The method of claim 14, further comprising supporting a portion of the track extending from the outer conduit with a frame structure.

16. The method of claim 12, further comprising inserting a plurality of inner conduits into a plurality of openings disposed through the body of the conduit spacer to support the inner conduits.

* * * * *